INVENTOR.
NICO PAVAN
BY
Pearson + Pearson
ATTORNEYS

United States Patent Office 2,792,304
Patented May 14, 1957

2,792,304

APPARATUS AND METHOD FOR RETAINING COLOR OF ALIMENTARY PASTE PRODUCTS

Nico Pavan, Padua, Italy, assignor to Senzani Machine Company, Lowell, Mass., a corporation of Massachusetts Application January 5, 1954, Serial No. 402,224

9 Claims. (Cl. 99—85)

This invention relates to a method and apparatus for making alimentary paste food products.

In the making of alimentary paste food products, it has been the custom to mix the dry, powdered ingredients such as semolina and the like, in open topped containers at an upper level in the factory. The dry, powdered ingredients have then been passed down a conduit by gravity into an open hopper at the entrance end of an elongated open topped mixing vat and upon entering the vat liquid has been combined therewith to form wet paste. Revolving paddles have then been used to mix the paste while continuously advancing the same along the horizontally extending open topped vat to the exit end thereof. A suitable conduit has connected the exit end of the vat to extrusion dies, which may be at a lower level than the vat, and from which the product has been extruded in its final shape. The powdered flour ingredients of the paste have been of golden brown color and it is desirable that the final product retain this color.

However, of recent years, it has become the custom to mix certain enriching chemicals with the flour and these ingredients tend to cause the final product to have a somewhat unattractive and unappetizing grayish tinge. It has heretofore been proposed, especially in bread making, to enclose a dough mixing vat and to force cool air therein while exhausting warm air therefrom. In U. S. Patent No. 2,215,168 to Allred, it has further been proposed to enclose a dough mixing vat and continuously supply gaseous ammonia thereto to restore the color of the wheat. In U. S. Patent No. 2,298,644 to Hummel, it has further been proposed to provide an open hopper for receiving already mixed wet dough, the hopper feeding a screw conveyor which in turn extrudes the wet dough into a vacuum chamber. The wet dough is then again extruded by means of intermeshing gears through the usual extrusion dies into the open atmosphere. The effect of the Hummel apparatus and method is to free entrapped air in already formed dough rather than to retain or restore the color thereof, an effect not desired or obtained in the present inventions.

The principal object of this invention is to provide a method and apparatus for retaining the color of the wheat flour in the finally extruded product by novel and simple means not involving the use of gaseous ammonia or double extrusion of wet dough.

Another object of the invention is to provide an apparatus which eliminates air from the flour mixture from the time the dry flour is mixed until the wet paste is extruded into the atmosphere thereby avoiding the deleterious effect of atmospheric air in changing the color of the paste.

Still another object of the invention is to provide an improved mixing vat for paste wherein the vat is air sealed and provided with a transparent section through which the color of the paste may be viewed as it progresses along the airtight mixing chamber thereof.

A further object of the invention is to provide an horizontally-extending airtight paste forming and mixing chamber from which air is being continuously exhausted and which is fed at its entrance end with powdered and liquid ingredients without also being continually fed with supplies of air along with such ingredients.

A still further object of the invention is to provide a method of forming alimentary paste products without losing the original color of the ingredients thereof and without subjecting the same to gases such as air, ammonia or the like.

Other objects and advantages of the invention will be evident from the illustration of a preferred embodiment thereof in the accompanying drawings taken with the following detailed description. It will be obvious that changes may be made in the shape and size of the various elements of the invention without departing from the scope of the invention as outlined in the claims.

In the drawings, Fig. 1 is a side view, in section on line 1—1 of Fig. 3, of the invention.

Figure 1:
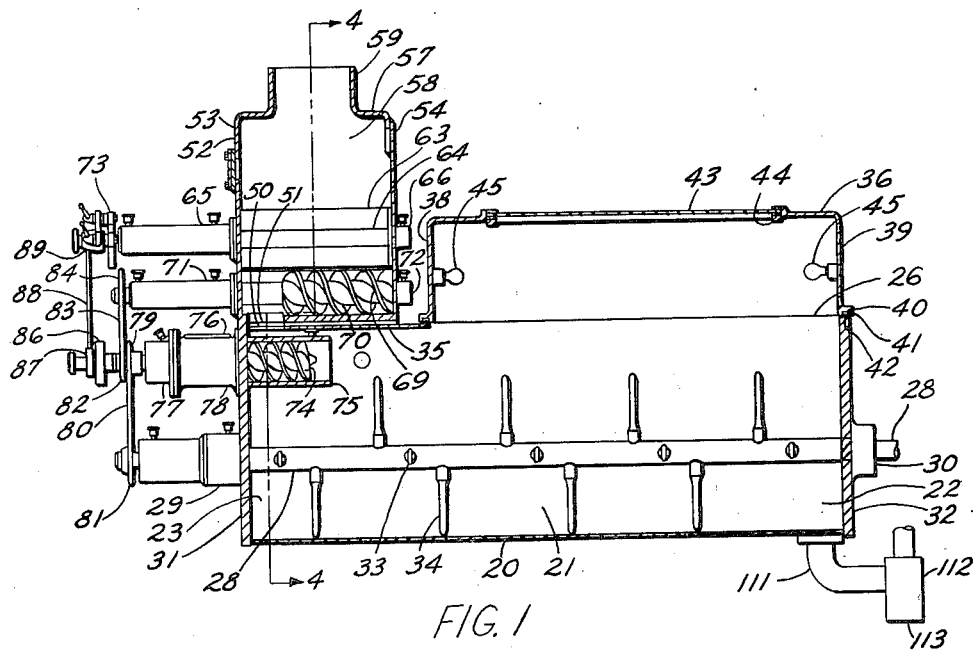
Figure 2:
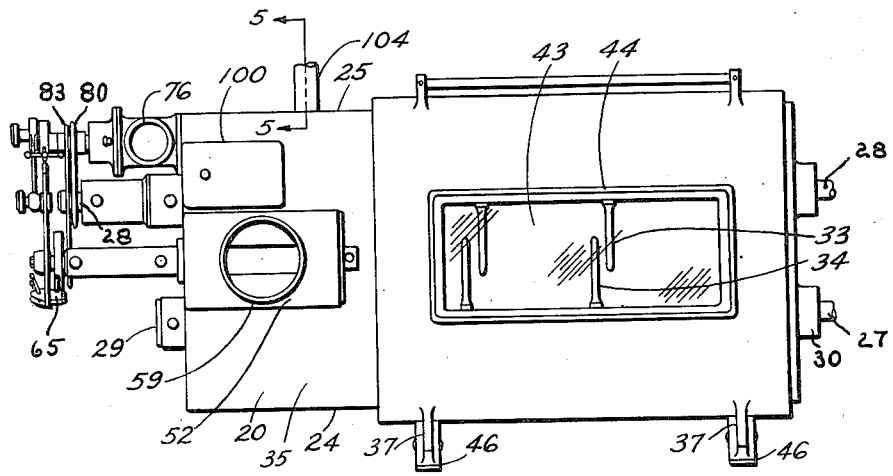
Fig. 2 is a plan view of the device shown in Fig. 1.
Figure 3:
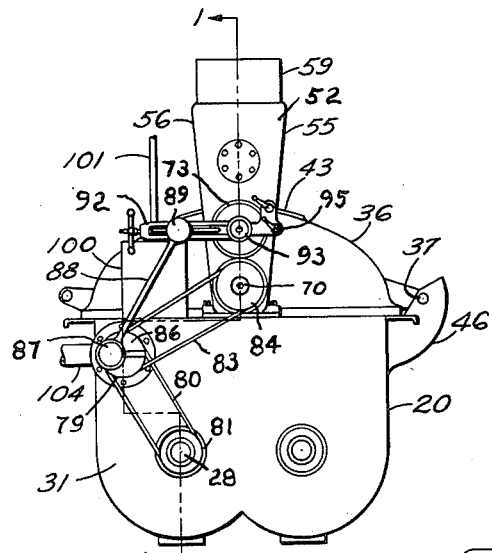
Fig. 3 is an end view of the device shown in Figs. 1 and 2.
Figure 4:
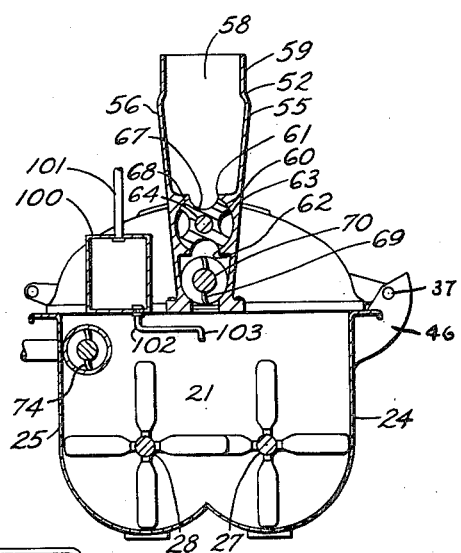
Fig. 4 is an end view in section on line 4—4 of Fig. 1.
Figure 5:
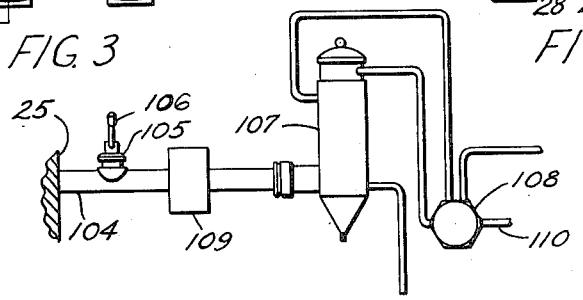
Fig. 5 is a fragmentary detail view of the condenser.

As shown in the drawings, the machine of this invention includes a main housing 20, having in the interior thereof, a horizontally extending mixing chamber 21. Chamber 21 has an exit end 22, an entrance end 23, side walls 24 and 25 and an opening 26 at the top thereof. A pair of parallel shafts 27 and 28 extend horizontally within chamber 21 of housing 20 each spaced an equal distance on an opposite side of the central longitudinal axis of chamber 21 but proximate the lower portion thereof. Shafts 27 and 28 are suitably journalled in air sealed and oil sealed bearings such as 29 and 30 in the end walls 31 and 32 of housing 20. Each shaft 27 and 28 is provided with staggered mixing paddles such as 33 and 34 and the shafts are cooperatively rotated by any suitable source of power not shown. The mixing paddles such as 33 and 34 are arranged to mix dry flour ingredients received at the entrance end 23 of chamber 21 with liquid also received at the entrance end 23 of the chamber, and to move the resulting paste toward the exit end 22 of the chamber in a manner well known in the art.

A fixed cover portion 35 is provided on housing 20, enclosing the entrance end portion 23 of chamber 21 and a movable cover portion 36 forms a closure for the opening 26 of the chamber 21. Movable cover 36 is hinged at 37 to suitable brackets 46 on housing 20 and preferably is of curved conformation with flat forward and rear end walls 38 and 39. A channel 40 extends around the periphery of cover 36 (see Fig. 1) and retains a resilient gasket 41 whereby the peripheral edge 42 of top opening 26 forms an air seal with the gasket when the cover 36 is closed. A longitudinally extending window 43 of transparent material, preferably of two spaced apart sheets, is permanently fixed in an opening 44 of movable cover 36 whereby the condition of the paste in chamber 21 may be observed. Artificial illumination is also provided within chamber 21 in the form of electric bulbs 45 to assist such observation.

An opening 50 is formed in the fixed cover 35 above the entrance end 23 of the airtight mixing chamber 21 and registers with a similar opening in the bottom wall 51 of the feed housing 52. Feed housing 52 preferably has vertical forward and rear walls 53 and 54, diverging side walls 55 and 56 and a flat top wall 57, said walls enclosing an airtight compartment 58. Compartment 58 is connected by airtight conduit 59 to the supply of dry powdered flour and chemical ingredients and is continually supplied therewith by gravity or any other suitable means not shown. Intermediate of compartment 58 the interior of the diverging walls 55 and 56 are formed with a cylindrical bore 60, having an upper, longitudinally extending slot 61 connecting with the flour supply and an identical opposite lower slot 62 connecting with the mixing chamber 21. A cylindrical valve rotor 63 is revolvably fitted within bore 60, thus forming the gate means of the invention, and mounted on a shaft 64 journalled in airtight and oil tight bearings 65 and 66. At least two, and preferably four, identical valve ports, or recesses, such as 67 extend longitudinally of the curved surface of rotor 63 for receiving a predetermined quantity of the dry ingredients through slot 61 and delivering the same through slot 62. The curved surface portions 68 of rotor 63, between the ports 67, are arranged to bear against the walls of bore 60 and block the passage of the ingredients or air and thus provide an air seal in the feed housing 52. As will be explained hereinafter, rotor 63 is revolved intermittently by a ratchet gear 73 in synchronization with the speed of the mixing paddles 33 and 34 to deliver measured quantities of the dry ingredients into mixing chamber 21 without introducing air thereto. A screw conveyor 69 is mounted below rotor 63 to revolve with a shaft 70 parallel to the shaft 64, the shaft 70 being journalled in airtight and oil tight bearings 71 and 72. Thus the dry ingredients intermittently delivered by the ports 67 of rotor 63 are continuously forced toward, and down through, the opening 50 into the mixing chamber 21.

A paste fragment screw conveyor 74 is preferably provided for feeding waste hardened paste into the mixing chamber 21 for recycling without admitting air into the chamber. Conveyor 74 is revolvable in a tubular housing 75 fixed in the end wall 31 of housing 20 at the entrance end 23 of chamber 21. A feed hopper 76 is mounted above the exterior end of the conveyor 74 to receive the fragments and the screw conveyor 74 forms an effective air block in the tubular housing 75 to permit air in the mixing chamber 21 to be continuously and substantially exhausted. Conveyor 74 is journalled in bearings 77 and 78 and is rotated by a sprocket 79 carried on the exterior terminal end thereof. Sprocket 79 is driven by a chain 80 which in turn is driven by a sprocket 81 carried by the mixing paddle shaft 28. Conveyor 74 also carries a sprocket 82, driving a chain 83 trained around a sprocket 84 on the shaft 70 of screw conveyor 69 whereby both screw conveyors continuously revolve in synchronization with the shafts 27 and 28.

Figure 6:
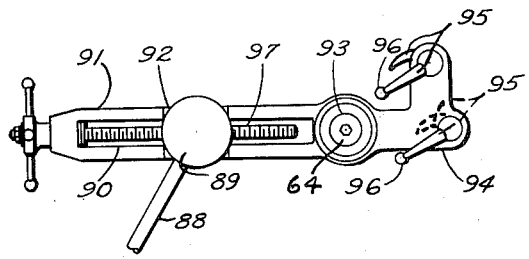
Fig. 6 is a detail view of the ratchet and pawl mechanism for rotating the feed valve of the device.

A continuously rotating driving element 86 is mounted on the terminal end of screw conveyor 74 and provided with a diametrically extending slot in which the follower 87 of a connecting arm 88 is slidably mounted. The opposite end 89 of arm 88 is slidably adjustable to various fixed positions in a slot 90 in the long arm 91 of a bell crank lever 92. Lever 92 is pivoted at 93 on the shaft 64 of rotor 63 and its shorter arm 94 carries at least one pivoted pawl 95 engaged in ratchet gear 73. Thus the continuous revolution of element 86 causes the pawl 95 to intermittently rotate the rotor 63 and the speed of revolution may be adjusted by adjusting the position of the end 89 in slot 90. As best shown in Fig. 6 preferably a pair of pawls such as 95 are used, each counterweighted at 96. Preferably also an adjusting screw 97 is provided for moving the end 89 in slot 90 to various positions and retaining the same in the selected position.

A tank 100 is provided on housing 20, fed with liquid such as water, by a pipe 101 and connected by a pipe 102 to the interior of mixing chamber 21. The pipe 102 is bent to deliver liquid from its terminal end 103 directly over the dry ingredients being delivered through opening 50 and additional liquid inlet pipes may be provided at spaced points along chamber 21 to furnish additional liquid if desired.

An air exhaust pipe 104 may be connected to the upper portion of the airtight mixing chamber 21 through an opening in the fixed cover 35, or preferably, as shown, through one of the side walls such as 25 of housing 20. Air exhaust pipe 104 is provided with an air valve 105, having a manually operated handle 106 whereby the opening of the valve admits air to the chamber 21, thereby relieving the suction therein and permitting the movable cover 36 thereof to be opened. As indicated in Fig. 6, the pipe 104 passes through a condenser 107 and thence to an air exhaust pump 108 of any well known type and powered in any well known manner. A sediment tank or filter 109 may be used in pipe 104 and the exhaust port of pump 108 is indicated at 110. The air valve 105 may be mounted on the housing 20 itself if desired, rather than on the pipe 104.

In operation, the paste mixing chamber 21 is substantially air sealed by the covers 35 and 36, by the fragment conveyor 74, by the powdered ingredient valve rotor 63 and by the liquid in the pipes 102 and tank 100. The feed housing 52 is also airtight and all of the shafts and bearings are oil tight as well as airtight. Thus the mixture of dry powdered flour and chemicals in conduit 59 and in housing 52 is protected from exposure to air or other gases and, most important, the chamber 21 wherein the alimentary paste is formed and mixed is continually exhausted of air by the pump 108. Furthermore, the paste discharge conduit 111, leading from chamber 21 to the extrusion dies, 112, is also airtight. Thus there is no possibility of air causing a change in color of the flour and the paste extruded from the dies remains identical in color to the color of the flour.

The extrusion face of the dies 112 is designated 113 and it will be apparent that the illustration of the discharge conduit and the dies is diagrammatic only since they are well known in the art and may be of any well known type. It should be noted that macaroni machines having an open topped mixing chamber and means for feeding mixed paste therefrom to extrusion dies have long been used and are not claimed to have been invented by me in this application. One such machine, now much in use, is made by the Consolidated Macaroni Machine Company of Brooklyn, New York. In such machines the paste at the exit end of the chamber falls into a conduit by gravity and then into the path of a screw conveyor whereupon it is forcibly ejected from the dies. The sub atmospheric pressure in the enclosed mixing chamber of this invention does not prevent the paste from falling into the path of such a screw conveyor.

I claim:

1. In apparatus for continuously making alimentary paste products the combination of an elongated housing forming a horizontally extending airtight paste forming and mixing chamber therewithin, said chamber having an entrance end and an exit end and being adapted to guide paste along an extended horizontal path therebetween; a flour conduit leading into the entrance end of said chamber for introducing powdered, dry flour mixture therein; intermittently rotating gate means in said conduit permitting the passage of measured quantities of flour through said conduit while maintaining an air seal therein; a liquid supply pipe leading into the entrance end of said chamber, proximate said conduit, for introducing liquid into said chamber to form paste with said flour mixture; staggered mixing paddles carried by a pair of continuously revolving, horizontally extending shafts in the lower portion of said chamber for mixing said liquid with said dry powdered flour mixture to form paste and for advancing said paste along a horizontal path in the lower portion of said chamber to the exit end thereof; suction means leading from the upper portion of said chamber for continuously exhausting the air in said mixing chamber and maintaining sub atmospheric pressure therein and an airtight paste discharge conduit at the exit end of said chamber for continuously receiving paste from said chamber.

2. A combination as specified in claim 1 plus a paste fragment screw conveyor leading into the entrance end of said chamber, drive means connecting said paddle shafts to the feed screw of said fragment screw conveyor for continuously rotating the same and an open hopper feeding into said screw conveyor for introducing waste fragments of hardened alimentary paste into said chamber while retaining the sub atmospheric pressure therein.

3. A combination as specified in claim 1 wherein said elongated horizontally extending housing includes a cover opening extending along the major portion of the top, thereof, parallel to said horizontally extending paddle shafts, a curved, dished cover having a transaprent section, hingedly attached to said housing to close said opening and a gasket, of resilient material, around the rim of said opening forming an air seal when said cover is closed.

4. A combination as specified in claim 1 plus a flour supply screw conveyor in said flour conduit, in advance of said gate means, and means for receiving flour therefrom and delivering the same into said chamber operably connected with the shafts of said revolving paddles for continuously rotating the feed screw of said screw conveyor.

5. A combination as specified in claim 1 wherein said intermittently rotating gate means comprises a cylindrical bore in said flour conduit, said bore having an axially extending entrance slot connecting with the flour supply and an opposite, identical exit slot connecting with said mixing chamber, a cylindrical rotor tightly fitting said bore, said rotor having at least two axially extending, identical circumferential ports for retaining a quantity of flour and ratchet and pawl means operably connected to the shafts of said mixing paddles for intermittently turning said rotor to thereby bring a rotor recess in registration with said exit and entrance slots.

6. Apparatus for making alimentary paste without discoloration comprising an elongated, housing having a horizontally extending treatment chamber therein in which an air exhausted environment is maintainable, said chamber having an upper feed inlet opening at one end and a lower discharge outlet opening at the opposite end thereof; dry ingredient feeding valve means at said inlet opening, including a cylindrical rotor having circumferential ports for continuously measuring successive identical batches of said ingredients and mechanism for introducing the same in a continuous stream into said chamber independent of accompanying air; liquid supply means proximate said inlet opening for continuously introducing liquid into said chamber independent of accompanying air; a plurality of paste advancing and mixing paddles spaced longitudinally along a rotating, horizontally-extending shaft journalled in the lower portion of said housing, said paddles being arranged to impart a forwardly progressing and kneading movement to paste formed in said chamber below said inlet opening to urge said paste toward said discharge outlet opening and the effective cross sectional area of said paddles being less than, and in the lower portion of, the cross sectional area of said chamber to provide substantial free space in said chamber above the path of said paste and air suction means, leading from the upper portion of said chamber, for establishing and continuously maintaining a subatmospheric pressure therein and a substantially air free environment within said housing.

7. In continuous apparatus for producing alimentary paste food products, the combination of a housing having an air sealed horizontally extending chamber with staggered, revolving paddles therewithin for mixing wet paste and advancing said mixed paste from the inlet end to the outlet end thereof; air suction means connected to said chamber for continuously exhausting air therefrom; air sealed means, comprising an intermittently revolving valve rotor having spaced ports adapted to pass successive measured quantities of dry powdered flour ingredients and a horizontal feed screw conveyor adapted to receive flour from said valve rotor and feed the same continuously into said chamber; air sealed means for introducing liquid continuously into said chamber; and air sealed means for continuously conducting mixed paste from said chamber.

8. A method of making alimentary paste products which comprises continuously combining flour and enriching chemicals into a dry, powdered stream; then continuously exhausting the air from around said stream; then continuously mixing said stream with liquid from an independent source of supply and forming a horizontally advancing flow of kneaded alimentary paste mixture while continuing to exhaust air from said mixture; then continuously conveying said paste mixture to extrusion dies while continuing to exhaust air therefrom and then continuously extruding said paste mixture into the atmosphere in the form of alimentary paste products.

9. A process for making enriched alimentary paste while retaining the initial color of the flour ingredients therein, said process comprising the steps of first combining dry, colored flour ingredients with dry enriching, chemical ingredients into a dry mixture; then advancing said dry mixture in a succession of identical metered batches into an air free, sub atmospheric environment then advancing a continuous dry stream of said metered ingredients further into said environment, then combining said continuous dry stream of metered ingredients with liquid in said environment to form wet paste; then advancing said paste along an extended horizontal path through said environment while continuously kneading and mixing the same and then conducting said kneaded wet paste out of said air free, sub atmospheric environment.

References Cited in the file of this patent

UNITED STATES PATENTS

| 753,685 | Dreiss | Mar. 1, 1904 |
| 1,586,176 | Chapman | May 25, 1926 |
| 2,019,963 | Gillette | Nov. 5, 1935 |
| 2,059,730 | Gordon | Nov. 3, 1936 |
| 2,078,565 | Durst et al. | Apr. 27, 1937 |
| 2,215,168 | Allred | Sept. 17, 1940 |
| 2,298,644 | Hummel | Oct. 13, 1942 |
| 2,425,912 | Appel et al. | Aug. 19, 1947 |
| 2,588,196 | Barbieri | Mar. 4, 1952 |
| 2,712,799 | Braibanti et al. | July 12, 1955 |

FOREIGN PATENTS

| 568,093 | Great Britain | Mar. 19, 1945 |
| 478,017 | Italy | Feb. 12, 1953 |